(12) United States Patent
Tsuchida et al.

(10) Patent No.: US 6,499,257 B1
(45) Date of Patent: Dec. 31, 2002

(54) RETAINERLESS WEATHER STRIP

(75) Inventors: Hideshi Tsuchida, Hiroshima (JP);
Eiichi Baba, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 09/644,537

(22) Filed: Aug. 24, 2000

(30) Foreign Application Priority Data

Aug. 24, 1999 (JP) ............................................ 11-237120
Sep. 29, 1999 (JP) ............................................ 11-315764

(51) Int. Cl.$^7$ ................................................ E06B 7/16
(52) U.S. Cl. ...................... 49/495.1; 49/498.1; 49/493.1
(58) Field of Search ............................ 49/475.1, 489.1, 49/498.1, 493.1, 495.1

(56) References Cited

U.S. PATENT DOCUMENTS

| | | | | |
|---|---|---|---|---|
| 4,858,385 A | * | 8/1989 | Bright | 49/498.1 X |
| 4,945,681 A | * | 8/1990 | Nozaki et al. | 49/495.1 |
| 5,207,029 A | * | 5/1993 | Nozaki et al. | 49/495.1 |
| 5,389,409 A | * | 2/1995 | Iwasa et al. | 49/498.1 X |
| 5,918,421 A | * | 7/1999 | Nozaki | 49/498.1 X |

FOREIGN PATENT DOCUMENTS

| | | | | |
|---|---|---|---|---|
| GB | 2201711 | * | 9/1988 | 49/495.1 |
| GB | 2 334 288 A | | 8/1999 | B60J/10/00 |
| JP | 5038946 | * | 2/1993 | 49/495.1 |

OTHER PUBLICATIONS

Japanese Abstract No.: 59089220 dated May 23, 1984.
European Abstract No.: 1016559 dated Jul. 5, 2000.

* cited by examiner

*Primary Examiner*—Jerry Redman
(74) *Attorney, Agent, or Firm*—Sughrue Mion, PLLC

(57) ABSTRACT

A retainerless weather strip attached to a full door type door panel of an automobile by an attaching element except for a retainer, which comprises: a base portion to be fixed to an attaching portion of the door panel by at least one of a clip and an adhesive double coated tape; a hollow seal portion provided on an automobile interior side of the base portion so as to come into elastic contact with an automobile body; a seal lip portion provided on an automobile exterior side of the base portion, the seal lip portion comprising an upper end portion and an intermediate portion, so that the upper end portion of the seal lip portion comes into elastic contact with an automobile body and that the intermediate portion of the seal lip portion comes into elastic contact with a door panel; an end edge portion protruded from a lower end portion of the base portion on the automobile exterior side; and a neck portion formed in a connecting portion of the base portion with the seal lip portion on the automobile exterior side.

10 Claims, 5 Drawing Sheets

RETAINERLESS WEATHER STRIP

FIELD OF THE INVENTION

The present invention relates to a weather strip to be attached to a door panel of an automobile by an attaching means except for a retainer.

RELATED ART

Referring to FIGS. 1 to 3, related arts are explained below. A full door type door panel 20 of an automobile usually comprising an outer panel 22 and inner panel 21. On the inner panel 21, there is provided a retainer 53 for attaching a weather strip 50 to the inner panel 21. At a connecting portion of both panels, and also at a connecting portion of the inner panel 21 with the retainer 53, a sealant 54 is coated for prevention of rust as shown in FIG. 1.

However, according to the above-described technique, the following problems may be encountered. Since the rust prevention sealant 54 is coated as described above, the weather strip 50 attached to the door panel 20 interferes with this rust prevention sealant 54. Therefore, it is impossible to obtain a stable sealability between the weather strip 50 and the door panel 20.

In order to ensure a stable sealability of the entire weather strip, it is necessary to strongly fasten the weather strip 50 with the retainer 53 so that the weather strip 50 can be fixed. However, since the weather strip 50 is incorporated into the retainer in a state of simple insertion, the weather strip 50 slips when the door is opened and closed, which possibly deteriorates the sealability. Further, at an end portion of the retainer 53, a step portion, the height of which corresponds to the wall thickness of the retainer 53, is created between the retainer 53 and the inner panel 21. Accordingly, the sealability is damaged at this step portion. For the above reasons, when consideration is given to ensuring the sealability between the weather strip 50 and the door panel 20, it is preferable not to provide the retainer 53.

As shown in FIG. 3, in the case of a weather strip 50 having no retainers 53, it is proposed a means for ensuring the sealability of the door panel 20 by providing a small lip 52 which protrudes from an upper end portion of the base portion 51 and comes into elastic contact with the inner panel 21. However, the thus composed small lip 52 gets on a small arc portion 25 formed on the inner panel 21, so that the stable sealability can not be ensured. The reason why the stable sealability can not be ensured is described as follows. When the small lip 52 gets on the small arc portion 25, the sealability in this portion is lowered, and further the small lip 52 which has gotten on the small arc portion 25 does not sufficiently give a elastically contacting force by which a lower face of the base portion 51 of the weather strip 50 comes into elastic contact with the inner panel 21. For the above reasons, even when a highly expanded sponge member 17 or an adhesive double coated tape is provided on the lower face of the base portion 51, it is difficult to obtain a stable sealability. In this case, specific gravity of the highly expanded sponge member is usually in a range from 0.1 to 0.3.

Furthermore, when an adhesive tape is used, it needs an additional step of peeling off a mold releasing paper of the adhesive tape, taking undesirable time and a labor.

Thus, concerning the weather strip 50 attached to the retainer 53 provided on a conventional full door type door panel 20 of an automobile, it is difficult to stably ensure the sealability between the weather strip and the door panel 20. Further, since the small strip 52 provided at an upper end portion of the base portion 51 gets on the small arc portion 25 on the door panel 20, the sealability between the weather strip and the door panel 20 is deteriorated.

SUMMARY OF THE INVENTION

Accordingly, an object of the present invention is to solve the above-described problems and to provide a retainerless weather strip capable of providing stable sealability thorough the entire length thereof.

Another object of the present invention is to provide an attaching structure of a door weather strip by which the weight and cost of the weather strip can be reduced and further the time and labor to attach the weather strip can be reduced.

Other objects and effects of the present invention will become apparent from the following description.

The above-described objects of the present invention have been achieved by providing the following weather strips and weather strip assemblies.

(1) A retainerless weather strip attached to a full door type door panel of an automobile by an attaching means except for a retainer, which comprises:

a base portion to be fixed to an attaching portion of the door panel by at least one of a clip and an adhesive double coated tape;

a hollow seal portion provided on an automobile interior side of the base portion so as to come into elastic contact with an automobile body;

a seal lip portion provided on an automobile exterior side of the base portion, the seal lip portion comprising an upper end portion and an intermediate portion, so that the upper end portion of the seal lip portion comes into elastic contact with an automobile body and that the intermediate portion of the seal lip portion comes into elastic contact with a door panel;

an end edge portion protruded from a lower end portion of the base portion on the automobile exterior side; and a neck portion formed in a connecting portion of the base portion with the seal lip portion on the automobile exterior side.

(2) The retainerless weather strip according to the above item (1), wherein the end edge portion is a small lip which obliquely and upwardly comes into elastic contact with a flat portion of the door panel.

(3) The retainerless weather strip according to the above item (2), further comprising a highly expanded sponge member provided on a lower face of the base portion on the automobile exterior side.

(4) The retainerless weather strip according to the above item (1), wherein the end edge portion comprises a portion made of a highly expanded sponge material.

(5) The retainerless weather strip according to the above item (4), wherein the end edge portion is made of a highly expanded sponge material.

(6) The retainerless weather strip according to the above item (4), wherein an upper half of the end edge portion is made of the same material as that of the main body of the weather strip and has a lip or protrusion provided thereon, and a lower half thereof is made of a highly expanded sponge material.

(7) The retainerless weather strip according to the above item (4), wherein an upper half of the end edge portion is made of a highly expanded sponge material, and a lower half thereof is made of the same material as that of the main body of the weather strip.

(8) A retainerless weather strip assembly comprising:
a retainerless weather strip according to the above item (4); and
an inner panel having an engaging recess for holding the end edge portion of the retainerless weather strip,
wherein the size of the end edge portion of the retainerless weather strip is larger than that of the engaging recess of the inner panel, and the end edge portion is press-fitted into the engaging recess.

(9) The retainerless weather strip assembly according to the above item (8), wherein the inner panel has a small drain groove on a bottom face of the engaging recess.

(10) The retainerless weather strip assembly according to the above item (8), wherein the end edge portion is made of a highly expanded sponge material.

(11) The retainerless weather strip assembly according to the above item (8), wherein an upper half of the end edge portion is made of the same material as that of the main body of the weather strip and has a lip or protrusion provided thereon, and a lower half thereof is made of a highly expanded sponge material.

(12) The retainerless weather strip assembly according to the above item (8), wherein an upper half of the end edge portion is made of a highly expanded sponge material, and a lower half thereof is made of the same material as that of the main body of the weather strip.

BRIEF DESCRIPTION OF THE DRAWINGS

FIG. 5 is a perspective view showing an outline of a door panel to which a retainerless weather strip of the present invention is attached, wherein FIG. 5 shows a state of the door panel at portion B shown in FIG. 1 when the door panel is viewed from the inside of an automobile.

FIG. 7 is a view showing an embodiment of the present invention, wherein FIG. 7 shows a die-molding portion of the weather strip at portion B shown in FIG. 1.

FIG. 8 is a view showing another embodiment of the present invention, wherein FIG. 8 shows a die-molding portion of the weather strip at portion B shown in FIG. 1.

PREFERRED EMBODIMENT OF THE INVENTION

Figure 4:
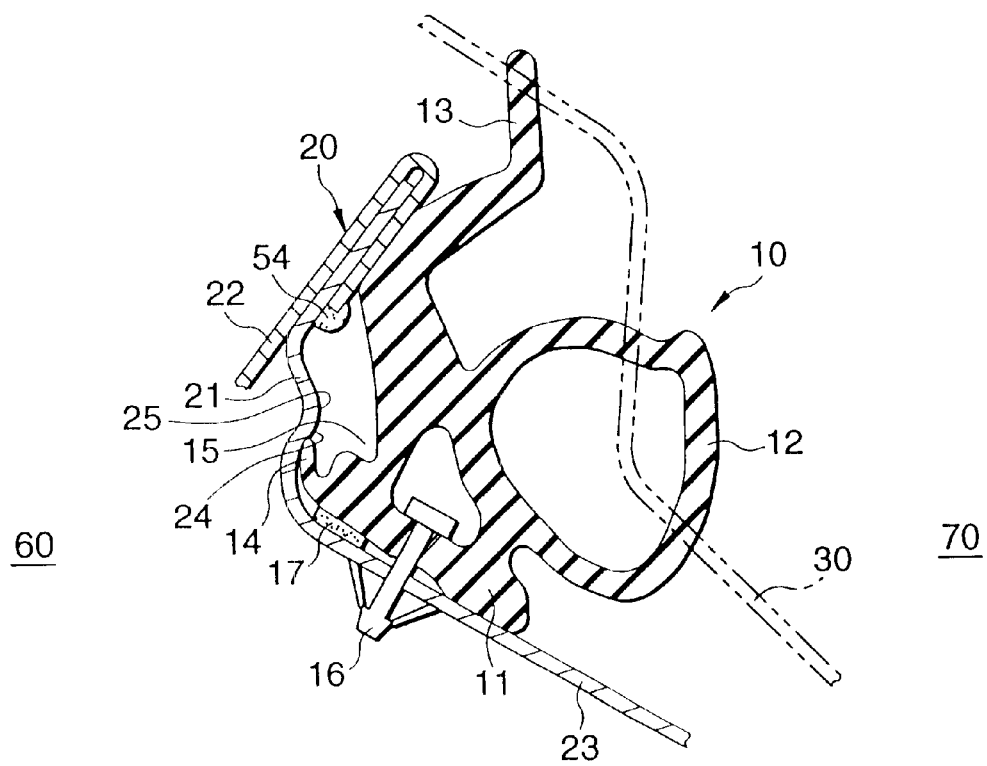
FIG. 4 is a cross-sectional view taken on line A—A in FIG. 1 showing a first preferred embodiment of the present invention.

The first preferred embodiment of the present invention is shown in FIG. 4. The retainerless weather strip 10 of this embodiment is attached to a full door type door panel 20 of an automobile by a means except for a retainer. In this weather strip 10, there is provided a hollow seal portion 12 on the automobile interior side 70 of a base portion 11 which is fixed to an attaching portion 23 on a door panel 20 with a clip 16, and also there is provided a seal lip portion 13 on an automobile exterior side 60. The hollow seal portion 12 comes into elastic contact with a body 30, and an upper end portion of the seal lip portion 13 comes into elastic contact with the body 30, and further the intermediate portion comes into elastic contact with the door panel 20.

In this connection, instead of the clip 16, an adhesive double coated tape (not shown), or both the adhesive double coated tape and the clip 16 may be provided between the base portion 11 and the inner panel 21.

Further, also provided is a small lip 14 which obliquely and upwardly comes into elastic contact, from a lower end portion 24 of the base portion 11 on the automobile exterior side 60, with a flat portion 24 of the door panel 20. Furthermore, a necked part 15 is formed on the automobile exterior side 60 in a connecting portion of the base portion 11 and the seal lip portion 13. Moreover, a highly expanded sponge member 17 can be provided on a lower face of the base portion 11 on the automobile exterior side 60. Due to the above structure, the sealability between the weather strip and the door panel 20 can be stabilized.

Figure 5:
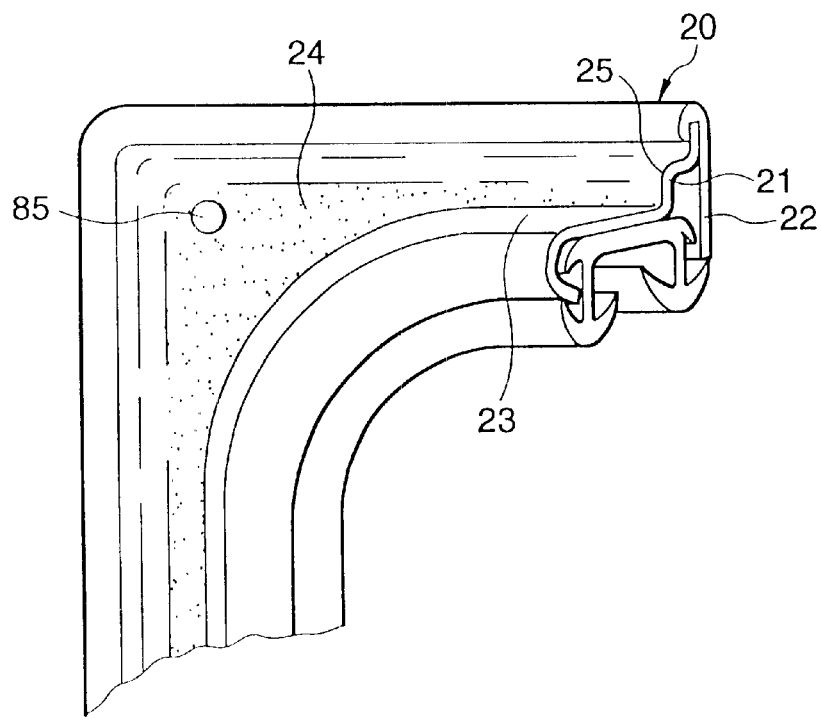
Figure 6:
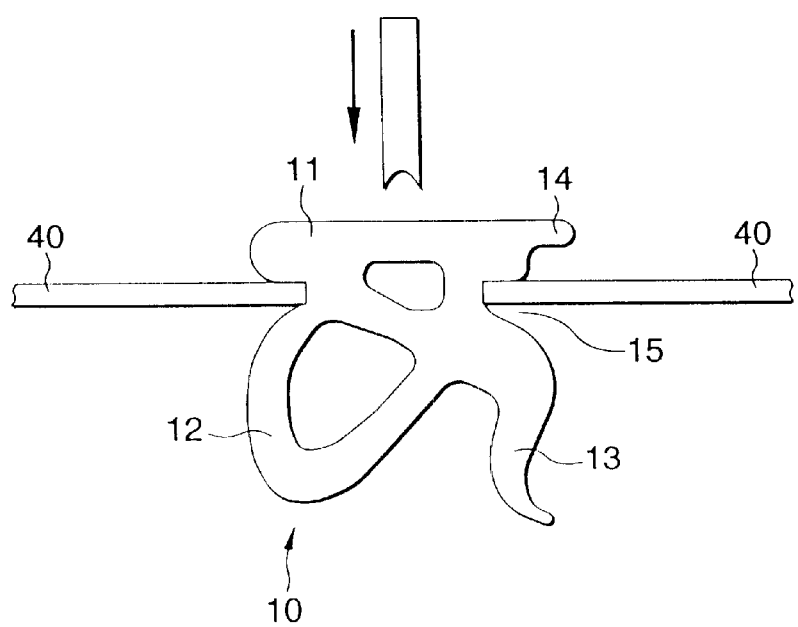
FIG. 6 is a vertically cross-sectional view showing a final process of processing a retainerless weather strip of the present invention.
Figure 7:
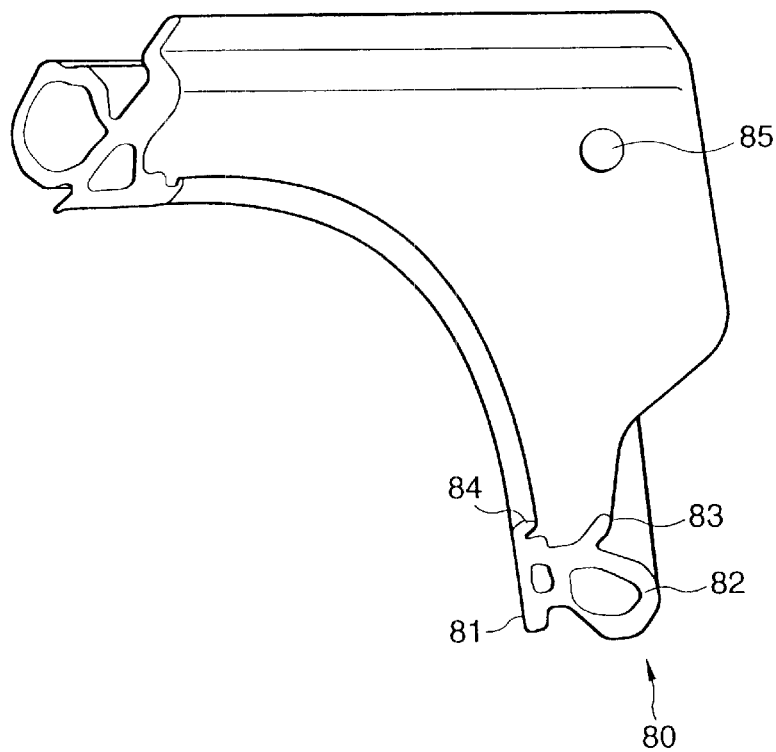
Figure 8:
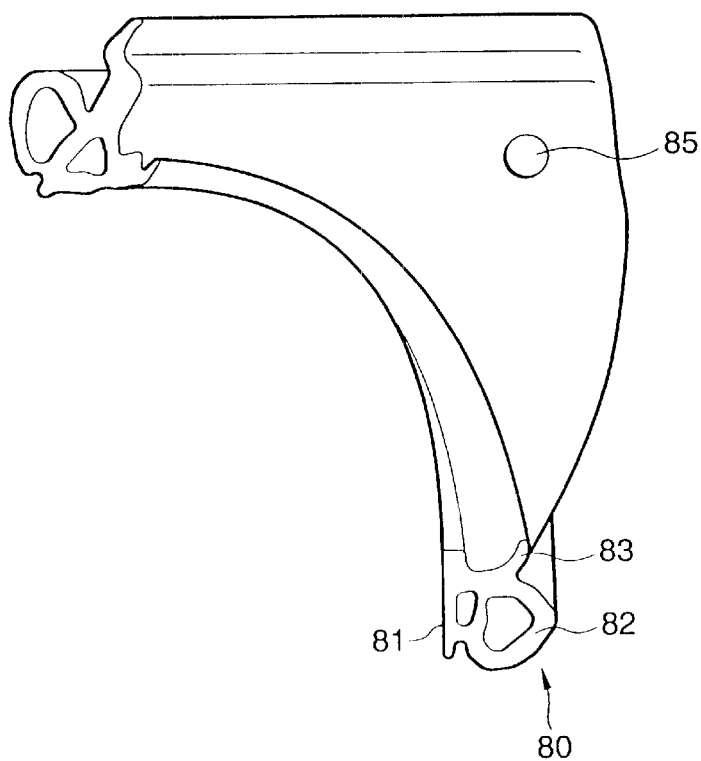

FIG. 7 is a view showing an example of a die-molding portion of the weather strip of the present invention. FIG. 8 is a view showing another example of a die-molding portion of the weather strip of the present invention. These die-molding portions of the weather strip are to be counterposed to the flat portion 24 plotted by a large number of dots on FIG. 5. Reference numeral 80 is a die-molding weather strip, reference numeral 81 is a base portion, reference numeral 82 is a hollow seal portion, reference numeral 83 is a seal lip portion, reference numeral 84 is a small lip, and reference numeral 85 is a clip member.

Next, the action of this retainerless weather strip 10 is explained below. Since this weather strip 10 is attached to the door panel 20 with the clip 16 that is an attaching means except for a retainer, there is provided no rust prevention sealant, which is conventionally coated in the connecting portion between the retainer and the inner panel 21, in the flat portion 24 on the door panel 20. Accordingly, there is no possibility that the weather strip 10 interferes with the rust prevention sealant and that the sealability is deteriorated in the portion. As a result, the sealability between the weather strip 10 and the door panel 20 can be stabilized over the entirety thereof.

Since no retainer is required in this embodiment, no material cost, processing cost and attaching work cost for a retainer are required. Therefore, productivity can be greatly enhanced.

In this weather strip 10, the small lip 14 is provided, which obliquely and upwardly comes into elastic contact, from a lower end portion of the base portion on the automobile exterior side 60, with the flat portion 24 of the door panel 20. Accordingly, an elastically contacting force of this small lip 14 with the door panel 20 is stronger than that generated in a conventional case where the small lip gets on the small arc portion 25 on the door panel. Therefore, the sealability in this portion can be stabilized. Further, since the small lip 14 obliquely comes into elastic contact with the door panel 20, the base portion 11 of the weather strip 10 can be positively prevented from moving upward, and the sealability between the highly expanded sponge member 17, which is attached to a lower face of the base portion 11, and the door panel 20 can be stabilized. Due to the above structure, the sealability between the weather strip 10 and the door panel 20 can be stabilized over the entirety thereof.

Since the small lip 14 protrudes from the lower end portion of the base portion 11, it is possible to form a necked portion 15 in the connecting portion 60 of the base portion 11 and the seal lip portion 13. When the small lip is protruded from an upper end portion of the base portion 11 like a conventional technique, the root portion of the small lip becomes narrow and weak. Therefore, it is impossible to ensure a strong elastic force of the small lip, and it is impossible to form a necked portion between the base portion 11 and the seal lip portion. However, according to the weather strip 10 of the present invention, the small lip 14 protrudes from a lower end portion of the base portion 11. Accordingly, even when the necked portion 15 is formed in the portion concerned, the size of the root portion is not affected, and the elastic force of the small lip 14 is not affected by forming the necked portion 15.

When the weather strip 10 is subjected to final machining, this necked portion 15 performs a very important role. When a hole for inserting the clip 16 or a drain hole is formed by machining the base portion 11 of the weather strip 10, or when the clip 16 is inserted into the clip hole, the necked portion 15 performs a role of the support portion for receiving the guide 40. When this necked portion 15 is provided, this final machining can be conducted not manually but mechanically. Therefore, productivity can be greatly enhanced.

The retainerless weather strip 10 of the present invention is attached to the door panel 20 by an attaching means except for a retainer. Accordingly, there is provided no rust prevention sealant 54 which is conventionally coated in the connecting portion between the retainer and the inner panel 21. Accordingly, there is no possibility that the weather strip 10 interferes with the rust prevention sealant 54 and that the sealability is deteriorated in the portion. As a result, the sealability between the weather strip 10 and the door panel 20 can be stabilized over the entirety thereof.

Further, no retainer is required. Accordingly, no material cost, processing cost and attaching work cost are required. Therefore, productivity can be greatly enhanced.

In this weather strip 10, the small lip 14 is provided, which obliquely and upwardly comes into elastic contact, from a lower end portion of the base portion 11 on the automobile exterior side 60, with the flat portion 24 of the door panel 20. Accordingly, an elastically contacting force of this small lip 14 with the door panel 20 is strong. Therefore, the sealability in this portion can be stabilized. Further, since the small lip 14 obliquely comes into elastic contact with the door panel 20, the base portion 11 of the weather strip 10 can be positively prevented from moving upward, and the sealability between the lower face of the base portion 11, and the door panel 20 can be stabilized. Due to the above structure, the sealability between the weather strip 10 and the door panel 20 can be stabilized over the entirety thereof.

In addition, the necked portion 15 formed in the connecting portion of the base portion 11 and the seal lip portion 13 on the automobile exterior side 60 performs function as a supporting portion for receiving the guide 40 when the weather strip 10 is finally machined by a processing machine. Therefore, the final machining of the weather strip 10 can be conducted by the machine. As a result, productivity can be greatly enhanced.

Figure 1:
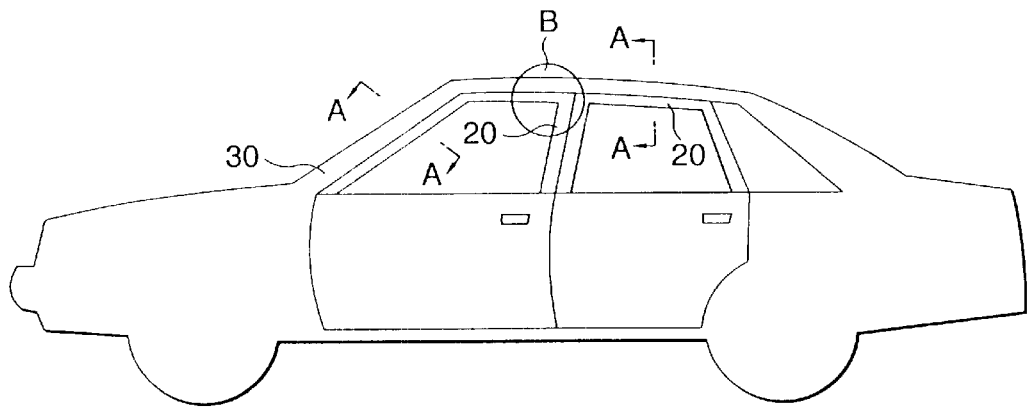
FIG. 1 is a side view showing an automobile to which a weather strip is attached.
Figure 2:
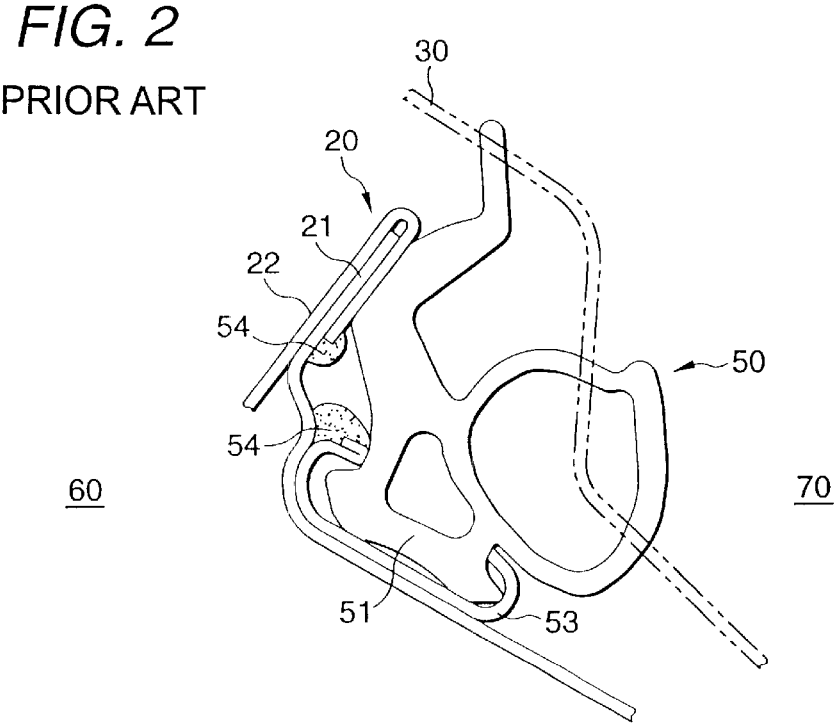
FIG. 2 is a cross-sectional view taken on line A—A in FIG. 1 showing the prior art.
Figure 3:
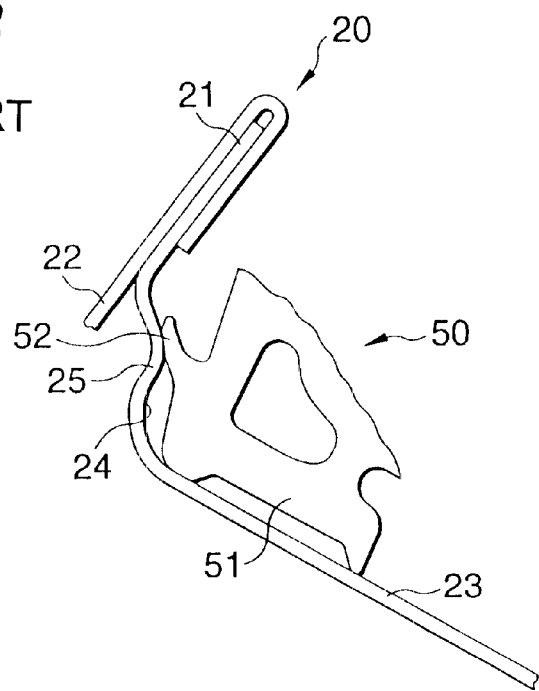
FIG. 3 is a vertically cross-sectional view showing another prior art.
Figure 9:
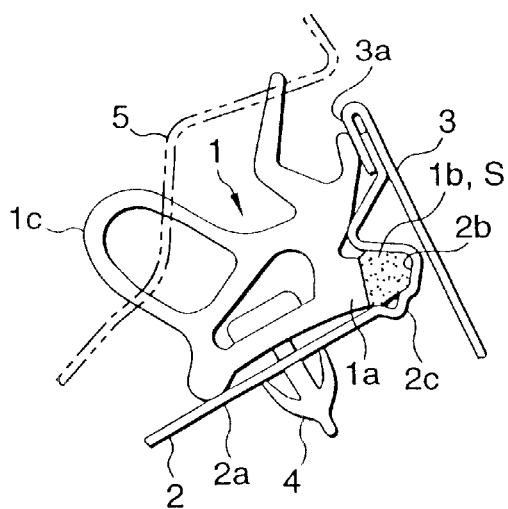
FIG. 9 is a cross-sectional view of an attaching structure of a weather strip of a second embodiment of the present invention taken on line A—A in FIG. 1.
Figure 10:
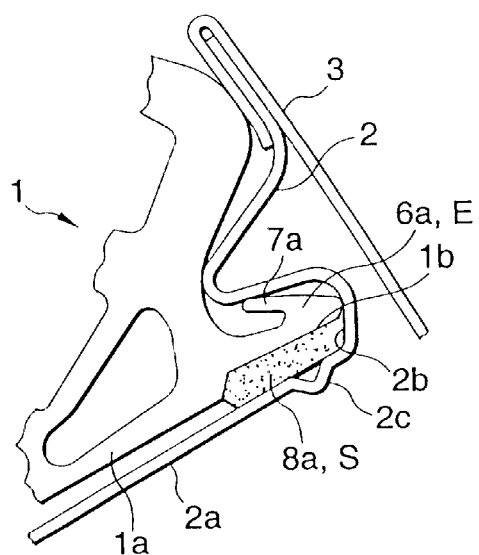
FIG. 10 is a cross-sectional view of an attaching structure of a weather strip of a third embodiment of the present invention.
Figure 11:
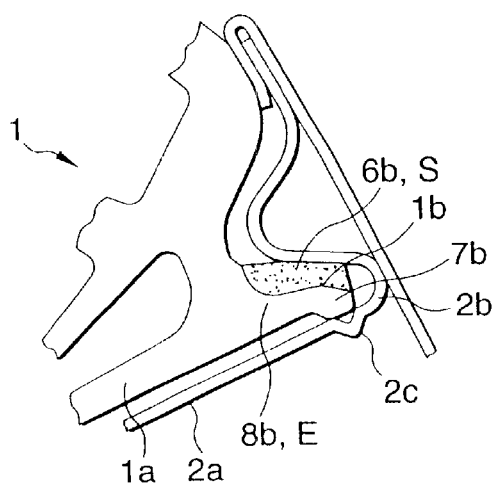
FIG. 11 is a cross-sectional view of an attaching structure of a weather strip of a fourth embodiment of the present invention.

Referring to FIGS. 9 to 11, the second to fourth preferred embodiments of the present invention are explained in detail below. In FIG. 9, reference numeral 1 is a weather strip according to the second preferred embodiment, which is for use in a roof portion of an automobile shown in FIG. 1. Only an end edge portion 1b, which protrudes to the automobile exterior side, of an attaching base portion 1a is made of highly expanded sponge material S. Reference numeral 2 is an inner panel of the peripheral edge portion of the door. On the inner panel 2, there is provided an engaging recess 2b at a rising portion of the flat attaching face 2a on the automobile exterior side. An upper end of the engaging recess 2b is connected with the folded portion of 3a of the outer panel 3. On a bottom face of the engaging recess 2b, there is provided a small drain groove 2c.

The thickness of the highly expanded sponge member S of the end edge portion 1b of the attaching base portion 1a is previously formed to be larger than the engaging recess 2b.

The weather strip 1 is attached on the door in such a manner that the attaching base portion 1a is fixed onto the attaching face 2a via the clip 4, and the end edge portion 1b of the attaching base portion 1a is press-fitted into the engaging recess 2b. That is, the end edge portion 1b is tightly engaged with the engaging recess 2b, and a strong reaction force is generated in the highly expanded sponge member S. By this strong reaction force, even a portion of the attaching base portion 1a distant from the clip 4 can be strongly fixed onto the inner panel 2. Therefore, it can be expected that the end edge portion 1b can be prevented from coming out from the engaging recess 2b in the same manner as the case where a conventional retainer is used. Accordingly, it is possible to abolish the use of the retainer, and the manufacturing cost can be reduced, and further the attaching work can be made simple, that is, only when the end edge portion 1b is pushed into the engaging recess 2b, the attaching work can be completed. Further, water that has entered into the weather strip can be effectively discharged through the drain groove 2c. In this connection, when the door is closed, the hollow seal portion 1c comes into elastic contact with the door opening edge 5 of an automobile body.

FIG. 10 is a view showing the third embodiment. An upper half 6a of the end edge portion 1b of the attaching base portion 1a of the weather strip is made of the same synthetic rubber material E as that of the main body of the weather strip, and the lip or the protrusion 7a is provided in the upper portion thereof, and a lower half 8a of the end edge portion 1b is made of the highly expanded sponge material S. Accordingly, on the upper surface side of the engaging recess 2b, the end edge portion 1b enhances an engaging force by the action of the lip or the protrusion 7a, and on the lower surface side of the engaging recess 2b, it is possible to expect that the weather strip is prevented from coming out by the action of the highly expanded sponge member S, which is tightly attached to the engaging recess 2b, in the substantially same manner as that of the second preferred embodiment.

FIG. 11 is a view showing the fourth embodiment. In FIG. 11, the upper half 6b of the end edge portion 1b of the attaching base portion 1a of the weather strip is made of the highly expanded sponge material S, and the lower half 8b is made of the same material E as that of the main body of the weather strip, and the protrusion 7b is provided so that the weather strip can be easily inserted into the engaging recess 2b. The effect of this embodiment is substantially the same as that of the second and third embodiments described above.

As explained above, the attaching structure of the door weather strip of the present invention according to the second to fourth preferred embodiments is composed as follows. All or part of the end edge portion of the attaching base portion of the weather strip is made of a highly expanded sponge material, and the engaging recess is formed at the rising portion of the weather strip attaching face of the inner panel on the automobile exterior side, and the end edge portion of the attaching base portion is press-fitted into this engaging recess. Accordingly, the end edge portion of the attaching base portion of the weather strip can be positively prevented from coming off from the engaging recess by the action of a repelling force generated by the end edge portion made of the highly expanded sponge material that has been compressed. Therefore, it is unnecessary to provide a retainer unlike the conventional structure. Accordingly, the manufacturing cost can be reduced. Further, unlike the conventional structure in which an adhesive tape is used, the weather strip of this embodiment can be easily attached on the door without taking time and labor.

While the invention has been illustrated in detail and with reference to specific embodiments thereof, it will be apparent to one skilled in the art that various changes and modifications can be made therein without departing from the spirit and scope thereof.

What is claimed is:

1. A weather strip attached to a door panel of an automobile, which comprises:
    a base portion to be fixed to an attaching portion of the door panel by at least one of a clip and an adhesive double coated tape, wherein the clip and the adhesive double coated tape are at least partially disposed externally of the weather strip;
    a hollow seal portion provided on an automobile interior side of the base portion so as to come into elastic contact with an automobile body;
    a seal lip portion provided on an automobile exterior side of the base portion, the seal lip portion comprising an upper end portion and an intermediate portion, so that the upper end portion of the seal lip portion comes into elastic contact with an automobile body and that the intermediate portion of the seal lip portion comes into elastic contact with a door panel;
    an end edge portion protruded from a lower end portion of the base portion on the automobile exterior side;
    a neck portion formed in a connecting portion of the base portion with the seal lip portion on the automobile exterior side,
    wherein the end edge portion is a small lip which obliquely and upwardly comes into elastic contact, from a lower end portion of the base portion on the automobile exterior side, with a flat portion of the door panel; and
    a highly expanded sponge member provided on a lower face of the base portion on the automobile exterior side.

2. The weather strip according to claim 1, wherein the end edge portion comprises a portion made of a highly expanded sponge material.

3. The weather strip according to claim 2, wherein the end edge portion is made of a highly expanded sponge material.

4. A weather strip assembly comprising:
    a weather strip according to claim 2; and
    an inner panel having an engaging recess for holding the end edge portion of the weather strip,
    wherein the size of the end edge portion of the weather strip is larger than that of the engaging recess of the inner panel, and the end edge portion is press-fitted into the engaging recess.

5. The weather strip according to claim 4, wherein the inner panel has a small drain groove on a bottom face of the engaging recess.

6. The weather strip assembly according to claim 4, wherein the end edge portion is made of a highly expanded sponge material.

7. A weather strip attached to a door panel of an automobile, which comprises:
    a base portion to be fixed to an attaching portion of the door panel by at least one of a clip and an adhesive double coated tape;
    a hollow seal portion provided on an automobile interior side of the base portion so as to come into elastic contact with an automobile body;
    a seal lip portion provided on an automobile exterior side of the base portion, the seal lip portion comprising an upper end portion and an intermediate portion, so that the upper end portion of the seal lip portion comes into elastic contact with an automobile body and that the intermediate portion of the seal lip portion comes into elastic contact with a door panel;
    an end edge portion protruded from a lower end portion of the base portion on the automobile exterior side;
    a neck portion formed in a connecting portion of the base portion with the seal lip portion on the automobile exterior side,
    wherein the end edge portion comprises a portion made of a highly expanded sponge material, and
    wherein an upper half of the end edge portion is made of the same material as that of the main body of the weather strip and has a lip or protrusion provided thereon, and a lower half thereof is made of a highly expanded sponge material.

8. A weather strip attached to a door panel of an automobile, which comprises:
    a base portion to be fixed to an attaching portion of the door panel by at least one of a clip and an adhesive double coated tape;
    a hollow seal portion provided on an automobile interior side of the base portion so as to come into elastic contact with an automobile body;
    a seal lip portion provided on an automobile exterior side of the base portion, the seal lip portion comprising an upper end portion and an intermediate portion, so that the upper end portion of the seal lip portion comes into elastic contact with an automobile body and that the intermediate portion of the seal lip portion comes into elastic contact with a door panel;
    an end edge portion protruded from a lower end portion of the base portion on the automobile exterior side;
    a neck portion formed in a connecting portion of the base portion with the seal lip portion on the automobile exterior side,
    wherein the end edge portion comprises a portion made of a highly expanded sponge material, and
    wherein an upper half of the end edge portion is made of a highly expanded sponge material, and a lower half thereof is made of the same material as that of the main body of the weather strip.

9. A weather strip assembly comprising:
    a weather strip, wherein said weather strip comprises:
        a base portion to be fixed to an attaching portion of the door panel by at least one of a clip and an adhesive double coated tape;

a hollow seal portion provided on an automobile interior side of the base portion so as to come into elastic contact with an automobile body;

a seal lip portion provided on an automobile exterior side of the base portion, the seal lip portion comprising an upper end portion and an intermediate portion, so that the upper end portion of the seal lip portion comes into elastic contact with an automobile body and that the intermediate portion of the seal lip portion comes into elastic contact with a door panel;

an end edge portion protruded from a lower end portion of the base portion on the automobile exterior side;

a neck portion formed in a connecting portion of the base portion with the seal lip portion on the automobile exterior side wherein the end edge portion comprises a portion made of a highly expanded sponge material; and an inner panel having an engaging recess for holding the end edge portion of the weather strip, wherein the size of the end edge portion of the weather strip is larger than that of the engaging recess of the inner panel, and the end edge portion is press-fitted into the engaging recess, wherein an upper half of the end edge portion is made of the same material as that of the main body of the weather strip and has a lip or protrusion provided thereon, and a lower half thereof is made of a highly expanded sponge material.

10. A weather strip assembly comprising:

a weather strip, wherein said weather strip comprises:

a base portion to be fixed to an attaching portion of the door panel by at least one of a clip and an adhesive double coated tape;

a hollow seal portion provided on an automobile interior side of the base portion so as to come into elastic contact with an automobile body;

a seal lip portion provided on an automobile exterior side of the base portion, the seal lip portion comprising an upper end portion and an intermediate portion, so that the upper end portion of the seal lip portion comes into elastic contact with an automobile body and that the intermediate portion of the seal lip portion comes into elastic contact with a door panel;

an end edge portion protruded from a lower end portion of the base portion on the automobile exterior side;

a neck portion formed in a connecting portion of the base portion with the seal lip portion on the automobile exterior side wherein the end edge portion comprises a portion made of a highly expanded sponge material; and an inner panel having an engaging recess for holding the end edge portion of the weather strip, wherein the size of the end edge portion of the weather strip is larger than that of the engaging recess of the inner panel, and the end edge portion is press-fitted into the engaging recess, wherein an upper half of the end edge portion is made of a highly expanded sponge material, and a lower half thereof is made of the same material as that of the main body of the weather strip.

* * * * *